United States Patent
Min et al.

(10) Patent No.: US 12,312,442 B2
(45) Date of Patent: May 27, 2025

(54) METHOD FOR SEPARATING ORGANIC ZINC CATALYST USING FILTERING MEMBRANE

(71) Applicant: LG CHEM, LTD., Seoul (KR)

(72) Inventors: Kyung Min Min, Daejeon (KR); Sung Kyoung Kim, Daejeon (KR); Seung Young Park, Daejeon (KR); Sang Cheol Shin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 1012 days.

(21) Appl. No.: 16/973,692

(22) PCT Filed: Dec. 19, 2019

(86) PCT No.: PCT/KR2019/018131
§ 371 (c)(1),
(2) Date: Dec. 9, 2020

(87) PCT Pub. No.: WO2020/130686
PCT Pub. Date: Jun. 25, 2020

(65) Prior Publication Data
US 2021/0253790 A1    Aug. 19, 2021

(30) Foreign Application Priority Data

Dec. 19, 2018    (KR) .................. 10-2018-0165219

(51) Int. Cl.
| | | |
|---|---|---|
| *C08G 64/40* | (2006.01) | |
| *B01D 67/00* | (2006.01) | |
| *B01D 69/10* | (2006.01) | |
| *B01D 69/12* | (2006.01) | |
| *B01D 71/10* | (2006.01) | |
| *B01D 71/26* | (2006.01) | |
| *B01J 31/12* | (2006.01) | |
| *C08G 64/34* | (2006.01) | |

(52) U.S. Cl.
CPC ..... *C08G 64/406* (2013.01); *B01D 67/00931* (2022.08); *B01D 69/107* (2022.08); *B01D 69/12* (2013.01); *B01D 71/10* (2013.01); *B01D 71/261* (2022.08); *B01D 71/262* (2022.08); *B01J 31/12* (2013.01); *C08G 64/34* (2013.01); *B01D 2311/14* (2013.01); *B01D 2325/0283* (2022.08)

(58) Field of Classification Search
CPC .................. C08G 64/406; C08G 64/34; B01D 67/00931; B01D 69/107; B01D 69/12; B01D 71/10; B01D 71/261; B01D 71/262; B01D 2311/14; B01D 2325/0283; B01D 69/1071; B01D 69/10; B01D 71/26; B01D 67/00933; B01D 69/1213; B01D 69/1216; B01D 2323/06; B01D 2325/04; B01J 31/12; B01J 31/04; B01J 31/4061; Y02P 20/584; Y02W 30/62

USPC ........................................................ 528/502
See application file for complete search history.

(56) References Cited

U.S. PATENT DOCUMENTS

| | | |
|---|---|---|
| 2009/0078640 A1 | 3/2009 | Chu et al. |
| 2009/0227444 A1 | 9/2009 | Ong et al. |
| 2016/0115566 A1 | 4/2016 | Bhaduri et al. |
| 2016/0115567 A1 | 4/2016 | Bhaduri et al. |
| 2016/0194442 A1 | 7/2016 | Kim et al. |
| 2016/0208080 A1 | 7/2016 | Laemmerhold et al. |
| 2016/0289792 A1 | 10/2016 | Bhaduri et al. |
| 2017/0226284 A1 | 8/2017 | Sohn et al. |
| 2018/0079890 A1 | 3/2018 | Laemmerhold et al. |
| 2018/0105483 A1 | 4/2018 | Hashimoto |
| 2018/0169629 A1 | 6/2018 | Nakai et al. |
| 2018/0305542 A1 | 10/2018 | Lee et al. |
| 2019/0085121 A1 | 3/2019 | Hofmann et al. |
| 2021/0246263 A1* | 8/2021 | Kim ............. B01J 35/002 |

FOREIGN PATENT DOCUMENTS

| | | | |
|---|---|---|---|
| CN | 101463097 A | 6/2009 | |
| CN | 102311180 A | 1/2012 | |
| CN | 105637013 A | 6/2016 | |
| CN | 107708860 A | 2/2018 | |
| CN | 108350164 A | 7/2018 | |
| EP | 3219741 A1 | 9/2017 | |
| EP | 3222348 A1 * | 9/2017 | ........ B01J 31/16 |
| EP | 3348596 A1 | 7/2018 | |
| JP | 2007-167788 A | 7/2007 | |
| JP | 2010527772 A | 8/2010 | |
| JP | 2018531314 A | 10/2018 | |
| KR | 2010-0066140 A | 6/2010 | |
| KR | 10-2015-0050461 A | 5/2015 | |
| KR | 20160051979 A * | 5/2016 | |
| KR | 10-2017-0039674 A | 4/2017 | |
| KR | 10-2017-0048222 A | 5/2017 | |
| KR | 10-2017-0071519 A | 6/2017 | |
| KR | 2017-0106220 A | 9/2017 | |
| KR | 10-2017-0128396 A | 11/2017 | |
| KR | 10-2018-0043681 A | 4/2018 | |
| WO | 2015014732 A1 | 2/2015 | |
| WO | 2016143677 A1 | 9/2016 | |

OTHER PUBLICATIONS

Machine translation of KR 2017/0048222, Kim et al, May 8, 2017 (Year: 2017).*

(Continued)

*Primary Examiner* — Frances Tischler
(74) *Attorney, Agent, or Firm* — Bryan Cave Leighton Paisner LLP

(57) ABSTRACT

The present disclosure relates to a method for separating an organic zinc catalyst dispersed in a polyalkylene carbonate resin solution by filtering the polyalkylene carbonate resin solution using a composite filtering membrane, which is a composite material comprising a hydroxyl group-containing material and polyolefin material and has a form in which one or both surfaces of the polyolefin material is coated with the hydroxyl group-containing material.

10 Claims, 1 Drawing Sheet

(56) References Cited

OTHER PUBLICATIONS

Machine translation of KR 2016/0051979, Lee et al, May 12, 2016 (Year: 2016).*
"Dental resins and cement materials: Theory and Clinical", Edited by Gao Chengzhi, Beijing: People's Military Medical Press, May 2008, pp. 163-164, with partial English Translation.

* cited by examiner

METHOD FOR SEPARATING ORGANIC ZINC CATALYST USING FILTERING MEMBRANE

TECHNICAL FIELD

Cross-Reference to Related Applications

This application is a National Phase entry pursuant to 35 U.S.C. § 371 of International Application No. PCT/KR2019/018131 filed on Dec. 19, 2019, and claims the benefit of and priority to Korean Patent Application No. 2018-0165219, filed on Dec. 19, 2018, in the Korean Intellectual Property Office, all of which are hereby incorporated by reference in their entirety for all purposes as if fully set forth herein.

TECHNICAL FIELD

The present invention relates to a method for separating an organic zinc catalyst dispersed in a polyalkylene carbonate resin solution by filtering the polyalkylene carbonate resin solution.

BACKGROUND ART

Plastics are used as raw materials for various articles due to easy manufacturing and use convenience thereof and are used in various fields not only for disposable articles such as packaging films, disposable cups and disposable dishes, but also for building materials and automobile interior materials. As the amount of plastics used increases, the amount of plastic waste increases, and since most plastics are not decomposed in the natural environment, the plastic waste is mainly treated by incineration. However, the incineration causes a problem of environmental pollution such as poisonous gas. Recently, biodegradable plastics that are decomposed naturally in natural environments have been developed.

Biodegradable plastics are plastics that are decomposed slowly in water due to their chemical structure, and in wet environments such as soil or seawater, the biodegradable plastics start to be decomposed within several weeks and disappear within one to several years. Further, the degradation products of biodegradable plastics are less harmful to the environment because they are decomposed into harmless components such as water or carbon dioxide.

In particular, recently, the polyalkylene carbonate resin obtained by polymerization of epoxide with carbon dioxide attracts much attention as a kind of biodegradable resin. Polyalkylene carbonate is an amorphous transparent resin, has only an aliphatic structure unlike aromatic polycarbonate which is similar-series engineering plastic, and is synthesized by a copolymerization reaction of carbon dioxide and epoxide as direct monomers (main raw materials) in the presence of a catalyst. Polyalkylene carbonate has excellent transparency, elongation, and oxygen blocking performance, exhibits a biodegradable property, and has a merit of being completely decomposed into carbon dioxide and water during combustion and not leaving carbon residues.

Various methods for producing the polyalkylene carbonate resin have been studied, and in particular, an organic zinc catalyst, such as a zinc glutarate catalyst, which is a catalyst for carbon dioxide plastic polymerization in metal organic framework (MOF) series, and in which zinc and a dicarboxylic acid are bonded, have been widely known as a representative catalyst for the copolymerization reaction of epoxide with carbon dioxide.

An organic zinc catalyst is formed by reacting a zinc precursor with a dicarboxylic acid such as a glutaric acid and takes the form of fine crystalline particles. Due to the form of such fine crystalline particles, the organic zinc catalyst is uniformly dispersed in a polymerization solution after the polyalkylene carbonate resin polymerization reaction is completed in the solution, and thus, there was a limitation in that the organic zinc catalyst was not easily separated due to a small particle size thereof by using a general filter or centrifugation.

In order to efficiently separate an organic zinc catalyst uniformly dispersed in a polyalkylene carbonate resin solution, a method was developed in which a filter or a coagulant was used to coagulate the organic zinc catalyst and separate then the coagulated catalyst. Nevertheless, since the organic zinc catalyst has not only a small particle size but also a soft shape, the physical separation method in which the pore size is simply adjusted has a limitation.

Accordingly, development of a technique is demanded in which an organic zinc catalyst finely dispersed in a solution can be economically and efficiently separated without contaminating a polyalkylene carbonate resin.

PRIOR ART DOCUMENT

[Patent document] (Patent document 1) KR 10-2018-0043681 A

DISCLOSURE OF THE INVENTION

Technical Problem

An aspect of the present invention provides a method for economically and efficiently separating an organic zinc catalyst dispersed in a polyalkylene carbonate resin solution by using a composite filtering membrane which is composed of a composite material of a hydroxyl group-containing material and polyolefin material and has form in which the polyolefin material is coated with the hydroxyl group-containing material.

Technical Solution

According to an aspect of the present invention, there is provided a method for separating an organic zinc catalyst, the method including filtering, through a composite filtering membrane, a polyalkylene carbonate resin solution containing a polyalkylene carbonate resin and an organic zinc catalyst, wherein the composite filtering membrane is a composite material including a hydroxyl group-containing material and polyolefin material and has a form in which one or both surfaces of the polyolefin material is coated with the hydroxyl group-containing material.

Advantageous Effects

When using the method for separating an organic zinc catalyst, organic zinc catalyst particles are efficiently removed from a polyalkylene carbonate resin solution, so that a transparent high-purity polyalkylene carbonate solution can be obtained.

In addition, since an organic zinc catalyst can be removed even without a separate additive such as silica or diatomite, the organic zinc catalyst can be simply and easily removed even without contaminating a polyalkylene carbonate resin solution.

In addition, economic feasibility can be enhanced by using a filtering membrane easily available at low costs, and since the filtering membrane is not deformed even in a filtering process and filter cakes formed on the surface of the filtering membrane can be easily removed, the filtering membrane can be conveniently reused.

BRIEF DESCRIPTION OF THE DRAWINGS

FIG. 1 illustrates polyalkylene carbonate resin solutions after removing organic zinc catalysts according to an example and a comparative example of the present invention.

MODE FOR CARRYING OUT THE INVENTION

Hereinafter, the present invention will be described in more detail to help understanding the present invention. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The main purpose of the present invention is to finally obtain a high-purity polyalkylene carbonate in such a manner that a polyalkylene carbonate resin is formed by a polymerization reaction of carbon dioxide and epoxide under an organic zinc catalyst, and then the organic zinc catalyst finely dispersed in a polyalkylene carbonate resin solution is effectively separated.

The organic zinc catalyst does not have a hard ceramic structure but has a form like a sponge having a soft texture, and is therefore easily deformed in the polyalkylene carbonate resin solution. Thus, a simple physical separation method using a filtering membrane having smaller pores than the particle size has a limitation. Meanwhile, the organic zinc catalyst exhibits hydrophilicity, whereas the solvent, the polyalkylene carbonate polymer, other by-products, and the like included in the polyalkylene carbonate resin solution have hydrophobicity.

The present invention is characterized in that the organic zinc catalyst is not physically collected by simply adjusting the pore size of a filtering membrane, but is efficiently separated from the polyalkylene carbonate resin solution by selecting a hydroxyl group-containing material as a material for the filtering membrane to cause an interaction of the organic zinc catalyst and the filtering membrane.

In addition, by considering that the hydroxyl group-containing material has a merit of having strong interaction with the organic zinc catalyst, but is weak against deformation due to high hygroscopicity and degrades the physical property of the filtering membrane, both the separation efficiency of the organic zinc catalyst and the stability of the composite filtering membrane are achieved by using the composite filtering membrane having a form in which polyolefin material used as a supporter is coated with the hydroxyl group-containing material.

Hereinafter, the present invention will be described in detail.

Organic Zinc Catalyst Separation Method

The present invention provides a method for separating an organic zinc catalyst, the method including filtering, through a composite filtering membrane, a polyalkylene carbonate resin solution containing a polyalkylene carbonate resin and an organic zinc catalyst, wherein the composite filtering membrane is a composite material including a hydroxyl group-containing material and polyolefin material and has a form in which one or both h the surfaces of the polyolefin material is coated with hydroxyl group-containing material.

In the present invention, the organic zinc catalyst may be dispersed in a particle state in a polyalkylene carbonate resin solution.

Due to the interaction between the polyalkylene carbonate and the organic zinc catalyst included in the polyalkylene carbonate resin solution, the organic zinc catalyst is uniformly dispersed in a particle state in the polyalkylene carbonate resin solution. Therefore, the conventional organic zinc catalyst separation method has a difficulty in separating the organic zinc catalyst dispersed in fine particle shapes, and in particular, when using a filtering membrane composed of a single material such as metal or polyolefin, the conventional organic zinc catalyst separation method has a problem in that the organic zinc catalyst is not efficiently collected to a filtering membrane due to the interaction between the polyalkylene carbonate and the organic zinc catalyst, so that an opaque polyalkylene carbonate resin solution is obtained in which the organic zinc catalyst still remains even though having undergone a filtering process.

According to an embodiment of the present invention, the organic zinc catalyst dispersed in a particle state in a polyalkylene carbonate polymerization solution is not physically filtered simply using pore sizes by using a composite filtering membrane, which has a material of a composite material of a hydroxyl group-containing material and polyolefin material, but the organic zinc catalyst finely dispersed in the solution can be more effectively separated by strongly collecting the organic zinc catalyst to a filtering membrane using interaction between the hydroxyl group in the composite filtering membrane and the zinc ions in the organic zinc catalyst.

The material of the composite filtering membrane is a composite material of a hydroxyl group-containing material and polyolefin material. Specifically, when using the hydroxyl group-containing material as the single component of the filtering membrane, there may be a problem in that the composite filtering membrane is weak against water-induced deformation due to high hygroscopicity, and the mechanical properties, such as the strength of the composite filtering membrane is degraded, and thus, the composite filtering membrane of the present invention is composed of a composite material including a hydroxyl group-containing material and polyolefin material. In addition, since polyolefin material serves as a supporter, the strength of the composite filtering membrane may be improved, and the surface area of the hydroxyl group-containing material can be maximally increased, so that the possibility of being in contact with the organic zinc catalyst is increased, the interaction between the hydroxyl group-containing material and the organic zinc catalyst can be more actively induced, and thus, the separation efficiency of the organic zinc catalyst can be further improved.

That is, in the present invention, in order to achieve both the interaction with the organic zinc catalyst and excellent mechanical properties, a hydroxyl group-containing material is mixed with polyolefin material and is used as a material for the composite filtering membrane, and thus, while the organic zinc catalyst is effectively confined in the composite filtering membrane, the structural deformation of the composite filtering membrane is prevented and the stability of a filtering process can be enhanced.

The hydroxyl group-containing material may be one or more selected from the group consisting of cellulose, glass fibers, hydroxypropyl cellulose, polyvinyl alcohol, silica and alumina. The silica and alumina are metal oxides and include the hydroxyl group-containing materials on the surface thereof, and specifically, silanol (SiOH) is present on the surface of the silica and aluminol (AlOH) is present on the surface of the alumina.

Cellulose is a material having the molecular formula of $(C_6H_{10}O_5)n$ and constituting main components of cell walls of higher plants, and is a polysaccharide compound containing a high content of hydroxyl group (—OH). Cellulose can effectively capture an organic zinc catalyst by causing a strong interaction with the organic zinc catalyst, for example, a hydrogen bond, and thus may favorably be used as one component of the composite filtering membrane.

The glass fiber is a material thinly drawn from glass like a fiber and contains a high content of hydroxyl group, and therefore has a characteristic capable of effectively separating the organic zinc catalyst by means of an interaction with the organic zinc catalyst in the same manner as cellulose.

The polyolefin material may be, but not limited to, a film or a nonwoven fabric formed of one or more selected from high-density polyethylene, low-density polyethylene, linear low-density polyethylene, ultrahigh molecular weight polyethylene, polypropylene, polybutylene, polypentene, polyethyleneterephthalate, polybutyleneterephthalate, polyester, polyacetal, polyamide, polycarbonate, polyimide, polyetheretherketone, polyethersulfone, polyphenyleneoxide, polyphenylenesulfidro, and polyethylenenaphthalene. For the purpose of the present invention, the polyolefin material may be a nonwoven fabric composed of polypropylene.

In particular, the composite material constituting a composite filtering membrane of the present invention is a hydroxyl group-containing material and may be a composite material which uses cellulose as the hydroxyl group-containing material and uses polypropylene as the polyolefin material, and a combination of the above two materials may favorably used for the composite filtering membrane.

The composite filtering membrane has a form in which one surface or both surfaces of polyolefin material are coated with the hydroxyl group-containing material.

As described above, in the composite filtering membrane of the preset invention, the composite material including the hydroxyl group-containing material and polyolefin material is used, and the two materials are not simply mixed, but has a form in which the polyolefin material is coated with the hydroxyl group-containing material. An existing composite filter membrane in which the polyolefin material and the hydroxyl group-containing material are uniformly mixed, cannot exhibit a filtering characteristic and may have a problem of not easily being used as a filtering membrane.

The composite filtering membrane according to the present invention may be, but not limited to, a material composed of spunlace, spunbond, meltblown, coform, airlaid, or a combination thereof.

In addition, the hydroxyl group-containing material may be coated at a thickness of 10 μm to 10 mm, specifically, may be coated at a thickness of 10 μm to 1000 μm. When the hydroxyl group-containing material is coated on to both surfaces of polyolefin material, the thickness may mean the thickness of the coating on one of both the surfaces. In addition, a coating of the hydroxyl group-containing material may be present such that the weight per unit area of the entire composite filtering membrane is 50 to 1,000 g/m² while satisfying the thickness, but the present invention is not limited to these embodiments.

In a composite material including the hydroxyl group-containing material and the polyolefin material, the weight ratio of the hydroxyl group-containing material and the polyolefin material may be 1:0.1 to 1:10, and favorably be 1:0.1 to 1:5, or 1:0.15 to 1:2.

When the polyolefin material content is small to be out of the range of the weight ratio, the physical property and strength of the filtering membrane is degraded and there may occur a problem in that the filtering membrane is easily deformed by a small impact or external stimulus, and when the polyolefin material content is excessive to be out of the range of the weight ratio, the hydrophilicity of the filtering membrane is not sufficient and thus the organic zinc catalyst cannot be effectively separated.

In the present invention, the organic zinc catalyst may include a zinc dicarboxylate-base compound. Specifically, the zinc dicarboxylate-base compound may include a zinc salt of C3-C20 aliphatic dicarboxylate or a zinc salt of C8-C40 aromatic dicarboxylate.

The C3-C20 aliphatic dicarboxylate includes glutarate, malonate, succinate, adipate, or the like, the C8-C40 aromatic dicarboxylate includes terephthalate, isophthalte, homophthalate, phenylglutarate, or the like, and zinc glutarate may favorably be used in aspects of activity and the like of the organic zinc catalyst, but the present invention is not limited to these embodiments.

The dicarboxylate is derived from dicarboxylic acids corresponding thereto, for example, C3-C20 aliphatic dicarboxylic acid such as glutaric acid, malonic acid, succinic acid, or adipic acid, or C8-C40 aromatic dicarboxylic acid such as terephthalic acid, isophthalic acid, homophthalic acid, or phenyl glutaric acid, and may be formed by a reaction of these dcarboxylic acids with zinc.

In the present invention, the viscosity of the polyalkylene carbonate resin solution may be 10-10,000 cP, favorably be 10-5,000 cP, and more favorably be 50-300 cP.

The viscosity indicates the amount exhibiting the degree of difficulty in fluid flow, that is, indicates the the degree of stickiness, and due to the viscosity of polyalkylene carbonate resin solution, it becomes more difficult to separate the organic zinc catalyst from the solution, and the higher the viscosity of the polyalkylene carbonate resin solution, the severer the phenomenon.

According to an embodiment of the present invention, even when the viscosity of the polyalkylene carbonate resin solution is a high numerical value as described above, the organic zinc catalyst may effectively be separated from the solution due to a strong interaction between the filtering membrane and the organic zinc catalyst.

In the present invention, the average pore size of the composite filtering membrane may be 0.1-10 μm, favorably be 1-10 μm, and more favorably be 1-5 μm.

The organic zinc catalyst has a particle size of a nanometer scale, but the catalyst particles are present in the form of aggregates in a medium, and thus, aggregates having an increased diameter and a decreased surface area are formed. The average particle diameters of the aggregates may be, but not limited to, 1-100 μm, 10-90 μm, or 50-80 μm.

The average pore size of the filtering membrane in the present invention is not determined to use smaller pores than the particles of the organic zinc catalyst to collect the particles, but determined by all considering the interaction between the organic zinc catalyst and the filtering membrane, the sizes of other byproducts, and inter-membrane pressure difference increased by reducing the pore size.

When the pore size of the filtering membrane is not excessively larger than the average particle diameter of aggregates, other byproducts are effectively caused to pass through the pores of the filtering membrane while capturing the organic zinc catalyst due to the interaction between the organic zinc catalyst and the filtering membrane.

According to an embodiment of the present invention, the filtering membrane of which the average pore size is adjusted is used. Thus, not only an excessive increase in the pressure difference can be prevented, but also the organic zinc can be effectively collected due to the interaction between the organic zinc catalyst and the filtering membrane.

When the average pore size of the filtering membrane is smaller than 0.1 μm, the possibility of separating small-sized organic zinc catalyst increases, but the inter-membrane pressure difference (ΔP) increases, and when the average pore size of the filtering membrane is larger than 10 μm, there may occur a problem in which a small-sized organic zinc catalyst and other byproducts pass through the filtering membrane.

In addition, when using the composite filtering membrane in the present invention, filtering may be performed while applying a pressure of 1-10 bar, 2-8 bar, or 2-4 bar during the filtering of the polyalkylene carbonate resin solution through the composite filtering membrane.

Method for Producing Polyalkylene Carbonate Resin

In addition, the present invention provides a method for producing a polyalkylene carbonate resin, the method including: polymerizing carbon dioxide and monomers including epoxide compounds in the presence of an organic zinc catalyst; and obtaining a polyalkylene carbonate resin by removing the organic zinc catalyst using method for separating the organic zinc catalyst according to the present invention.

In the polymerizing of carbon dioxide and monomers including epoxide compounds, the organic zinc catalyst may be used in the form of a heterogeneous catalyst, and the polymerizing may be performed as a liquid phase polymerization in a solution.

As the solvent used in the liquid phase polymerization, methylene chloride, ethylene dichloride, trichloroethane, tetrachloroethane, chloroform, acetonitrile, propionitrile, dimethylformamide, N-methyl-2-pyrrolydone, dimethylsulfoxide, nitromethane, 1,3-dioxolane, 1,4-dioxine, hexane, toluene, tetrahydrofuran, methylethylketone, methylamine ketone, methyl isobutyl ketone, acetone, cyclohexanone, trichloroethylene, methyl acetate, vinyl acetate, ethyl acetate, propyl acetate, butylolactone, caprolactone, nitropropane, benzene, styrene, xylene, methyl propasol, or a mixture of two or more thereof may be used, and favorably dichloromethane or dichloroethane is used as a solvent, so that polymerization may be more effectively performed, but the present invention is not limited to these embodiments.

The epoxide compound may be, but not limited to, one or more selected from the group consisting of C2-C20 alkylene oxide unsubstituted or substituted with halogen or C1-C5 alkyl group, C4-C20 cycloalkylene oxide unsubstituted or substituted with halogen or C1-C5 alkyl group, and C8-C20 styrene oxide unsubstituted or substituted with halogen or C1-C5 alkyl group.

Specific examples of the C2-C20 alkylene oxide unsubstituted or substituted with halogen or C1-C5 alkyl group include, but are not limited to, ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxy-7-octane, epifluorohydrin, epichlorohydrin, epibromohydrin, isopropyl glycidyl ether, butyl glycidyl ether, t-butyl glycidyl ether, 2-ethylhexyl glycidyl ether, allyl glycidyl ether, or the like.

Specific examples of the C4-C20 cycloalkylene oxide unsubstituted or substituted with halogen or C1-C5 alkyl group include, but are not limited to, cyclopentene oxide, cyclohexene oxide, cyclooctene oxide, cyclododecene oxide, alpha-pinene oxide, 2,3-epoxynorbornene, limonene oxide, dieldrin, or the like.

Specific examples of the C8-C20 styrene oxide unsubstituted or substituted with halogen or C1-C5 alkyl group include, but are not limited to, 2,3-epoxypropylbenzene, styrene oxide, phenylpropylene oxide, stilbene oxide, chlorostilbene oxide, dichlorostilbene oxide, 1,2-epoxy-3-penoxypropane, benzyloxymethyl oxirane, glycidyl-methylphenyl ether, chlorophenyl-2,3-epoxypropyl ether, epoxypropyl methoxyphenyl ether, biphenyl glycidyl ether, glycidylnaphthyl ether, or the like.

Besides, the method and process conditions for polymerizing carbon dioxide and monomers including epoxide compound may use, without limitation, general polymerization conditions for producing polyalkylene carbonate resins.

EXAMPLE

Hereinafter, the present invention will be described in more detail using examples. However, the following examples are merely for illustrating the present invention, and the scope of the present invention is not limited to the examples.

Example 1

1) Preparation of Polyalkylene Carbonate Resin

A polyalkylene carbonate resin solution was synthesized using carbon dioxide and ethylene oxide as reactants, and an organic zinc catalyst. The synthesized polyalkylene carbonate resin solution containing a polyalkylene carbonate resin, the organic zinc catalyst, and the like was used in an experiment below.

2) Separation of Organic Zinc Catalyst

A composite filtering membrane (average pore size 3 μm) composed of a cellulose-polypropylene composite material (the weight ratio of cellulose and polypropylene is 1:0.05) in which polypropylene was coated with cellulose was attached to both surfaces of a circular filter press chamber having the inner diameter 50 mm, and then filtering of the polyalkylene carbonate resin solution was started. The filtering was performed while changing the pressure of a pump for injecting the solution into the filter press chamber from 2 bar to 4 bar, the filtered solution was poured into a 250 ml glass bottle, and then the flow rate and transparency were checked. In addition, in order to check the remaining amount of the catalyst, an inductively coupled plasma (ICP) element (Zn) analysis was performed.

Examples 2 to 11

The same experiments as that in example 1 were performed except for changing the experimental conditions as shown in Table 1 below.

Comparative Example 1

A filtering membrane (average pore size of 3 μm) composed of a metal (SUS 316) was attached to the filter housing, and then the filtering of the polyalkylene solution was started. The filtering was performed while increasing the pressure applied to the filter housing up to 7 bar, the filtered solution was poured into a 250 mL glass bottle, and then the flow rate and the transparency were checked. In addition, in order to check the remaining amount of the catalyst, an inductively coupled plasma (ICP) element analysis was performed Comparative Examples 2 to 4

The same experiments as that in example 1 were performed except for changing the experimental conditions as shown in Table 1 below.

TABLE 1

| | Hydroxyl group-containing material | Polyolefin | Form | Weight ratio | Average pore size (μm) | Pressure |
|---|---|---|---|---|---|---|
| Example 1 | cellulose | polypropylene | coating | 1:0.05 | 3 | 2-4 bar |
| Example 2 | cellulose | polypropylene | coating | 1:0.25 | 3 | 2-4 bar |
| Example 3 | cellulose | polypropylene | coating | 1:0.25 | 3 | ≥4 bar |
| Example 4 | cellulose | polypropylene | coating | 1:1 | 3 | 2-4 bar |
| Example 5 | cellulose | polypropylene | coating | 1:15 | 3 | 2-4 bar |
| Example 6 | cellulose | polypropylene | coating | 1:0.25 | 0.04 | 2-4 bar |
| Example 7 | cellulose | polypropylene | coating | 1:0.25 | 25 | 2-4 bar |
| Example 8 | Glass fiber | polypropylene | coating | 1:0.25 | 3 | 2-4 bar |
| Example 9 | Glass fiber | polypropylene | coating | 1:1 | 3 | 2-4 bar |
| Example 10 | cellulose | polyethylene etc. | coating | 1:0.25 | 8 | 2-4 bar |
| Example 11 | glass fiber | polyethylene etc. | coating | 1:0.25 | 8 | 2-4 bar |
| Comparative example 1 | — | (use metal) | — | — | 3 | 2-4 bar |
| Comparative example 2 | — | polypropylene | — | — | — | 2-4 bar |
| Comparative example 3 | — | Polyethylene + polypropylene | coating | 1:1 | — | 2-4 bar |
| Comparative example 4 | cellulose | polypropylene | simple mix | 1:0.25 | 3 | 2-4 bar |

Experimental Example 1

FIG. 1 illustrates the results obtained by observing the polyalkylene carbonate resin solution obtained as described above with naked eyes, and the Zn contents remaining in the polyalkylene carbonate resin solution are listed in Table 2.

TABLE 2

| | Zn content (ppm) in polyalkylene carbonate resin solution | |
|---|---|---|
| | Before filtering | After filtering |
| Example 1 | 9375 | 70->6220 |
| Example 2 | | 55 |
| Example 3 | | 175 |
| Example 4 | | 110 |
| Example 5 | | 3370 |
| Example 6 | | 50 |
| Example 7 | | 2300 |
| Example 8 | | 60 |
| Example 9 | | 135 |
| Example 10 | | 240 |
| Example 11 | | 310 |
| Comparative example 1 | | 8455 |
| Comparative example 2 | | 8790 |
| Comparative example 3 | | 8560 |

TABLE 2-continued

| | Zn content (ppm) in polyalkylene carbonate resin solution | |
|---|---|---|
| | Before filtering | After filtering |
| Comparative example 4 | | 7180 |

As shown in Table 2, in case of the examples in which the organic zinc catalyst were separated according to the present invention, it was confirmed that the organic zinc catalyst was effectively separated compared to the comparative examples and thus the content of Zn ions remaining in the resin solution was remarkably low.

Specifically, as illustrated in FIG. 1, in example 2 in which the organic zinc catalyst is removed by using a composite material filter of cellulose (80%) and polypropylene (20%) according to the present invention, it was confirmed that the organic zinc catalyst was effectively removed and a transparent state was exhibited. On the other hand, in comparative example 1 in which a metal filter was used, the finely distributed organic zinc catalyst was not effectively removed, and consequently, it could be seen that even when compared with the polyalkylene carbonate resin, the transparency was not remarkably enhanced.

In addition, in example 1, it was confirmed that a very low Zn content remaining after filtering was exhibited and the organic zinc catalyst was effectively separated, but the stability of the composite filtering membrane decreases due to a low polyolefin content, and after the composite filtering membrane was partially deformed, the Zn content was measured to be high due to penetrated organic zinc catalyst. In addition, even in example 3, in which a pressure during filtering was increased to greater than 4 bar, it was shown that the filtering capability was slightly decreased compared to example 2 in which other reaction conditions were the same.

In example 6, the organic zinc catalyst was well separated due to the small pore size of 0.04 μm of the composite filtering membrane, but it was determined that since the amount of resin solution which may penetrate was inevitably small due to smaller pore sizes, economic feasibility and efficiency were slightly low. Also, in examples 8 and 9 in which glass fibers were hydroxyl group-containing material, and examples 10 and 11 in which polyethylene was used as polyolefin material, the results of efficient separation of the organic zinc catalyst were confirmed.

On the other hand, it could be seen that in comparative example 1 in which a metal was used as a filtering membrane, in comparative examples 2 and 3 in which filtering membranes not coated with hydroxyl group-containing materials were used, and in comparative examples 4 in which cellulose was not coated but is uniformly mixed with polypropylene to be used as a filtering membrane, the separation of the organic zinc catalyst was not effectively performed.

The invention claimed is:

1. A method for separating an organic zinc catalyst, the method comprising:
  filtering, through a composite filtering membrane, a polyalkylene carbonate resin solution containing a polyalkylene carbonate resin and an organic zinc catalyst,
  wherein the composite filtering membrane is a composite material comprising a hydroxyl group-containing material and a polyolefin material,
  wherein the composite filtering membrane has a form in which one or both surfaces of the polyolefin material is coated with the hydroxyl group-containing material, and
  wherein the hydroxyl group-containing material is coated with a thickness of 10 μm to 10 mm.

2. The method of claim 1, wherein the hydroxyl group-containing material is one or more selected from the group consisting of cellulose, glass fibers including hydroxyl group, hydroxypropyl cellulose, polyvinyl alcohol, silica including hydroxyl group, and alumina including hydroxyl group.

3. The method of claim 1, wherein the polyolefin material is a film or a nonwoven fabric formed of one or more selected from the group consisting of high-density polyethylene, low-density polyethylene, linear low-density polyethylene, ultrahigh molecular weight polyethylene, polypropylene, polybutylene and polypentene.

4. The method of claim 1, wherein the organic zinc catalyst comprises a zinc dicarboxylate-based compound.

5. The method of claim 4, wherein the zinc dicarboxylate-base compound comprises a zinc salt of C3-C20 aliphatic dicarboxylate or C8-C40 aromatic dicarboxylate.

6. The method of claim 1, wherein a weight ratio of the hydroxyl group-containing material and the polyolefin material is 1:0.1 to 1:10.

7. The method of claim 1, wherein an average pore size of the composite filtering membrane is 0.1-10 μm.

8. The method of claim 1, wherein during the filtering step, a pressure of 1-10 bar is applied.

9. The method of claim 1, wherein the organic zinc catalyst is dispersed as a particle state in the polyalkylene carbonate resin solution.

10. The method of claim 1, wherein a viscosity of the polyalkylene carbonate resin solution is 10-10,000 cP.

* * * * *